(12) United States Patent
George et al.

(10) Patent No.: US 12,423,925 B1
(45) Date of Patent: Sep. 23, 2025

(54) AUGMENTED, VIRTUAL, OR MIXED REALITY SYSTEM

(71) Applicant: Amazon Technologies, Inc., Seattle, WA (US)

(72) Inventors: Kevin George, Missouri City, TX (US); Alexander Shyrokov, Durham, NH (US); Nicholas Persing, Reading, MA (US); Pranav Sukumar, Sammamish, WA (US); Pranav Pomalapally, Thousand Oaks, CA (US); Oumaima Sohab, Bethlehem, PA (US); Scott Mattocks, Bolton, MA (US); Connor Frazier, Reading, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 220 days.

(21) Appl. No.: 18/082,798

(22) Filed: Dec. 16, 2022

(51) Int. Cl.
| | |
|---|---|
| *G06T 19/00* | (2011.01) |
| *G06T 7/30* | (2017.01) |
| *G06T 7/60* | (2017.01) |
| *G06T 7/73* | (2017.01) |
| *G06T 17/00* | (2006.01) |

(52) U.S. Cl.
CPC .............. *G06T 19/006* (2013.01); *G06T 7/30* (2017.01); *G06T 7/60* (2013.01); *G06T 7/73* (2017.01); *G06T 17/00* (2013.01); *G06T 2207/30204* (2013.01); *G06T 2210/21* (2013.01)

(58) Field of Classification Search
CPC .......... G06T 19/006; G06T 7/30; G06T 7/60; G06T 7/73; G06T 17/00; G06T 2207/30204; G06T 2210/21
See application file for complete search history.

(56) References Cited

U.S. PATENT DOCUMENTS

| | | | |
|---|---|---|---|
| 2018/0029083 A1* | 2/2018 | Farlotti | G06V 30/40 |
| 2018/0218218 A1* | 8/2018 | Madan | G06F 3/0346 |
| 2022/0250844 A1* | 8/2022 | Kreis | B65G 1/1375 |
| 2023/0055890 A1* | 2/2023 | Liu | A63F 13/837 |

* cited by examiner

*Primary Examiner* — Chong Wu
(74) *Attorney, Agent, or Firm* — K&L Gates LLP

(57) ABSTRACT

In various examples, an augmented, mixed, or virtual reality device comprising a camera and a display may determine first storage buffer with a first bin in a physical environment. The augmented, mixed, or virtual reality device may generate a first virtual object including a first virtual bin, the first virtual object corresponding to the first storage buffer and the first virtual bin corresponding to the first bin. The augmented, mixed, or virtual reality device may receive first data indicating a first object located in the first bin. First graphical data highlighting the first virtual bin may be generated. The first graphical data highlighting at least the portion of the first virtual bin on a first portion of the display may be generated. The first portion of the display may overlay at least a portion of the first bin in a field of view of the camera.

20 Claims, 7 Drawing Sheets

AUGMENTED, VIRTUAL, OR MIXED REALITY SYSTEM

BACKGROUND

Augmented and mixed reality systems combine the real, physical world with virtual objects displayed in a display that depicts both real-word objects in the physical environment and graphical representations of virtual objects as though the virtual objects are part of the physical environment. Virtual reality systems display a virtual world to the user via a display. In augmented reality systems, both virtual and real-world objects may be displayed together. However, in augmented reality, the representation of real world objects are captured by a camera and displayed on the display. In mixed reality systems, the display is at least partially transparent so that real world objects can be viewed by the human eye, while virtual objects are displayed on the transparent display and may appear to a viewer as though they are part of the physical environment. Overlaid virtual information can be constructive, in which the virtual objects add to the physical environment (e.g., adding text describing nutritional information to a plate of food) or destructive, in which the virtual objects mask some part of the physical environment. Augmented, mixed, or virtual reality alters an ongoing perception of the real world and, as such, is considered to be an immersive aspect of the physical environment.

DETAILED DESCRIPTION

Figure 1:
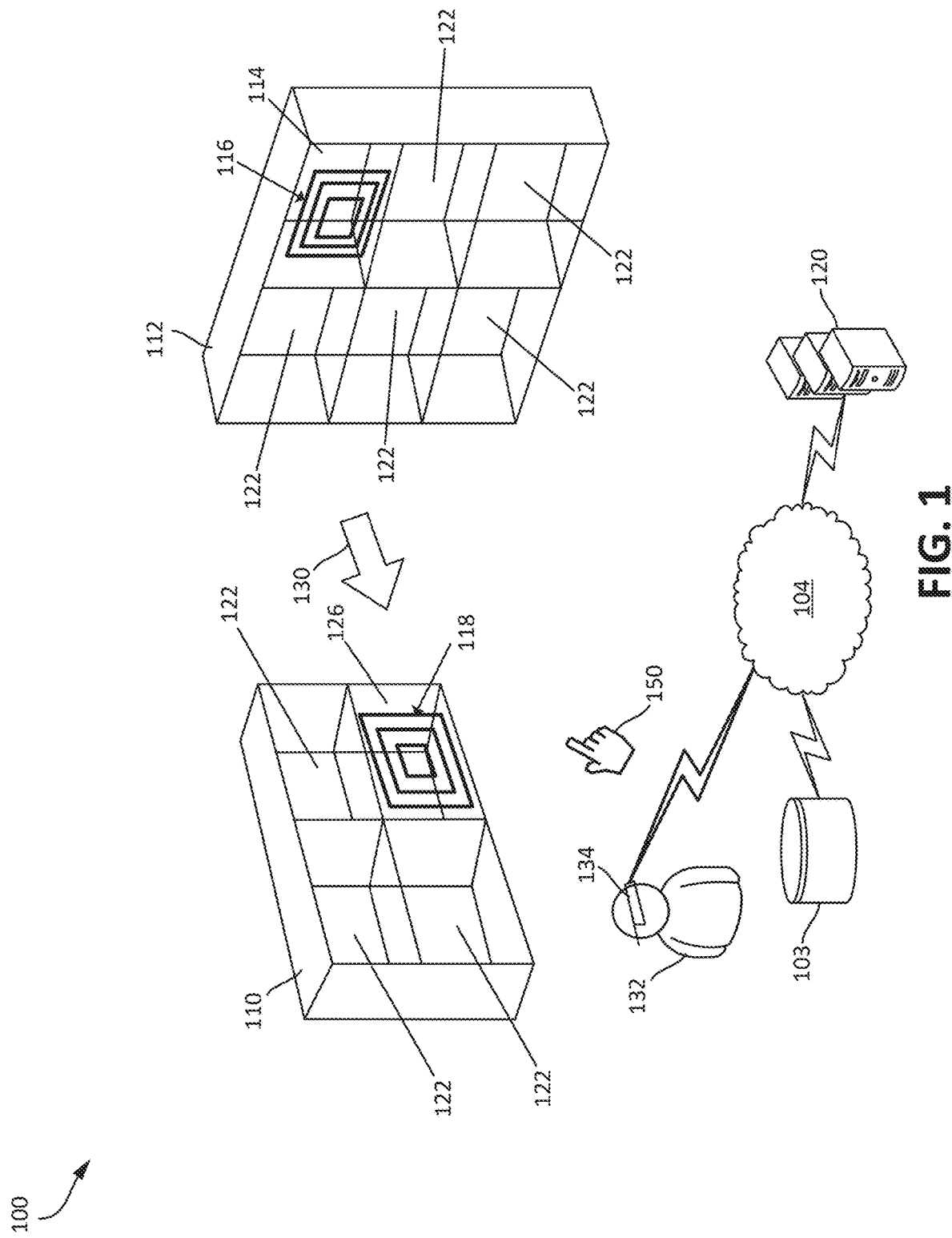
FIG. 1 is a diagram of an example augmented, virtual, or mixed reality system, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Large-scale delivery and inventory management systems may use fulfillment centers and other large warehouses that serve as part of the supply chain and can serve as a hub for logistics and processes used to get items from third party sellers to purchasers. In some cases, workers in such sites may be tasked with picking particular items and/or packages from mobile storage units (e.g., robotically controlled mobile storage units, sometimes referred to as "pods") and placing the items into specific bins and/or containers on other mobile storage units (e.g., carts which may be manually moved or may be robotically controlled). At this point, the items, as sorted by the worker, may be packaged for delivery and may be loaded onto one or more delivery vehicles for shipping the packages to another site and/or to the customer's home. This process describes one example of an "outbound" procedure. Conversely, in an inbound procedure, items may arrive on a truck and may be loaded from mobile storage units (e.g., carts) onto robotically-controlled mobile storage units that may be used to temporarily store items until such items are needed in an outbound procedure.

These operations performed by the worker are sometimes referred to as "picking." As such, the stations where the workers receive the inbound mobile storage units and move items from one storage unit to another are sometimes referred to as "picking stations." Currently, various camera and projector systems are used to assist pickers with their various tasks. In other examples, radio frequency identification systems (e.g., RFID readers and RFID tags) may be used to determine whether the user has selected the appropriate package and/or whether the user has interacted with the correct bin. In an example, a projector may project a colored light onto a specific bin on a mobile storage unit that contains an item that is to be moved to a second bin on a cart. A camera and/or computer vision algorithm may determine that the correct bin has been interacted with. In some cases, the item selected from the bin may be scanned so that the system may determine that the correct item has been selected from the bin. At this point, the projector may project a new light onto the bin on the cart into which the picked item should be placed. Such techniques may be used to assist the picking task and may make the task more intuitive and may increase processing speed and decrease processing errors. However, the equipment, which includes a monitor to show the next package to be picked and/or the relevant bin(s) from which to pick the item and/or into which to place the item, multiple cameras to detect when bins have been interacted with, multiple projectors to project visible cues onto the bins and/or items, etc., is expensive, bulky (the camera and projection systems are typically installed in an overhead canopy requiring specialized installation, calibration, etc.), with many different components—each of which may fail causing system downtime. Additionally, RFID systems can lack precision and may not be useful for selecting between bins and/or packages that are relatively close together.

Described herein is an augmented, mixed, or virtual reality based system that may localize the mobile storage units and the bins (and/or other storage locations such as containers or cart/pod positions, etc.) and may thereafter be used to highlight the appropriate mobile storage units as well as the individual bins with which the user should next interact. The augmented, mixed, or virtual reality system may guide the user using an intuitive augmented, mixed, or virtual reality interface that visually directs the user using graphical information overlaid onto the real physical environment. The graphical information may be used to visually highlight the next container/bin with which the user should interact. Additionally, the augmented, mixed, or virtual reality system may provide guidance hints that directs the user to look toward the appropriate bin even when the bin/container is not currently in the user's field-of-view (e.g., the field-of-view of the camera(s) of the augmented, mixed, or virtual reality system). Further, the augmented, mixed, or virtual reality system may detect user interaction with the highlighted bin to verify that the user has performed the desired action. The systems described herein may reduce the amount of hardware required, as a monitor or other display which displays the next action and/or the next item to be picked is no longer needed when using many of the augmented, mixed, or virtual reality systems and techniques described herein.

In various examples, instead of projecting lights onto fixed locations in order to direct a user as to which container/bin/item, etc., to interact with, the augmented, mixed, or virtual reality systems described herein may use various computer modeling techniques to form a three dimensional model of the surrounding environment including the mobile storage units and/or the bins thereon with which the user interacts. For example, the augmented, mixed, or virtual reality system camera(s) may scan fiducials (e.g., QR codes, barcodes, etc.) that are present on the mobile storage units and/or other physical objects within the workstation in order to determine a transform describing the physical objects. The transform may represent an object's position (e.g., coordinates in the virtual environment), rotation (relative to predefined axes of the virtual environment), and scale (e.g., a magnitude of the object along the axes with relevant units). The fiducials may be automatically scanned by the augmented, mixed, or virtual reality system when they are in the field-of-view of the camera(s). Accordingly, the virtual objects representing physical objects are generated merely by the user glancing in the direction of the physical objects.

In some examples, the augmented, mixed, or virtual reality system may use computer vision techniques to generate and/or refine the virtual objects. For example, instead of using a fiducial as previously described, the augmented, mixed, or virtual reality system may use an object detection machine learning model (e.g., a convolutional neural network, a visual transformer, an autoencoder, etc.) to detect objects of interest in a given environment (e.g., mobile storage units and/or bins located thereon and/or other objects of interest in the user's workstation). In some examples, the machine learning models may be used to refine the transform of a virtual object whether the virtual object is generated by scanning a fiducial or using one or more computer vision models.

Machine learning techniques, such as those described herein, are often used to form predictions, solve problems, recognize objects in image data for classification, etc. For example, herein machine learning techniques may be used to detect the position, rotation, and scale (e.g., the transform), and/or class of objects represented within frames of image data. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram of an example augmented, mixed, or virtual reality system 100, according to various aspects of the present disclosure. As depicted in FIG. 1, computing device(s) 120 may include a non-transitory computer-readable memory 103 and/or may be configured in communication with non-transitory computer-readable memory 103, such as over network 104. In some examples, non-transitory computer-readable memory 103 may store instructions that, when executed by at least one processor of computing device(s) 120, may be effective to perform one or more of the various techniques described herein. In various examples, network 104 may represent a local area network (LAN) and/or a wide area network (WAN) such as the internet. Computing device(s) 120 may be effective to implement system 100. For example, the computing device(s) 120 may represent one or more processors of an augmented, mixed, or virtual reality device 134 that may be worn and/or otherwise carried by a user 132. In various examples, the augmented, mixed, or virtual reality device 134 may comprise a headset or eyeglasses that may include the computing device(s) 120, the non-transitory computer-readable memory 103, one or more cameras (not specifically shown in FIG. 1), and/or one or more displays (e.g., a transparent and/or semi-transparent display on the glasses and/or headset). The camera(s) of the augmented, mixed, or virtual reality device 134 may be one or more cameras configured to capture image data representing a physical environment such as a designated work place (e.g., a warehouse, fulfillment center, laboratory, etc.). The camera(s) may capture image and/or video data. Video data may comprise a plurality of frames of image data. Generally, video data and/or image data captured by the camera(s) of the augmented, mixed, or virtual reality device 134 may be described herein as image data (for brevity). The display of the augmented, mixed, or virtual reality device 134 may be display virtual objects (e.g., highlights, text, graphical hints, etc.) that may not be part of the physical environment, but which may be displayed overlaying the physical environment on the display such that the virtual objects appear as though they are part of the physical environment to the wearer of the augmented, mixed, or virtual reality device 134 (e.g., user 132).

Additionally, the augmented, mixed, or virtual reality device 134 may include a power source (e.g., one or more batteries, a wired power interface, or some combination of the two) and/or a wired and/or wireless network interface (e.g., a network card), a radio frequency transceiver, etc. The augmented, mixed, or virtual reality device 134 may use the network interface to communicate with one or more other computing devices. For example, workflow data from an inventory system and/or other system may be provided to the augmented, mixed, or virtual reality device 134 via the network interface.

FIG. 1 depicts an example of a workstation of user 132. This workstation is by way of example only and may vary according to the environment in which the augmented, mixed, or virtual reality system is deployed. In the example, there may be a first storage buffer 110 (e.g., a mobile storage unit, table, stationary shelf, tote, robotically-controlled mobile storage unit, etc.) and a second storage buffer 112 (e.g., a mobile storage unit, stationary shelf, tote, robotically-controlled mobile storage unit, etc.). In various examples, the second storage buffer 112 may be transported by a robotic drive system. For example, the second storage buffer 112 may be transported to the workstation shown in FIG. 1 according to first data representing a workflow for the user 132. In this example, the workflow may determine various items stored in mobile storage units such as the second storage buffer 112 within the facility. The workflow may indicate that various items stored by mobile storage units are to be packaged and/or otherwise grouped together as part of an outbound workflow and placed into a specific bin/container of the first storage buffer 110. In various examples, the robotic drive unit of the second storage buffer 112 may navigate the second storage buffer 112 to the workstation as part of the workflow data so that the user 132 may pick the relevant item from a bin/container of the second storage buffer 112. After the user 132 has picked all the relevant items from the second storage buffer 112 (according to the workflow data), the second storage buffer 112 may be returned to a field of robotically-controlled mobile storage units until such time as a workflow (at some workstation) indicates that an item in the second storage buffer 112 is to be picked for an outbound workflow or until such time as items are to be placed onto the second storage buffer 112 as part of an inbound workflow (e.g., a workflow that loads mobile storage units with items and/or tracks per-mobile storage unit inventory). When the second storage buffer 112 has vacated the workstation, a new robotically-controlled mobile storage unit 112 may be driven to the workstation, according to the workflow data, so that the user 132 may pick the relevant item(s) from that workstation, and so on.

The workflow data may also indicate that the user is to place a particular item that is picked from the second storage buffer 112 into a particular bin/container of the first storage buffer 110. The first storage buffer 110 may be robotically controlled and/or may be manually controlled (e.g., the first storage buffer 110 may be on casters or wheels and may be pushed/pulled by a user and/or remotely controlled). Similarly, although in some examples the second storage buffer 112 may be robotically-controlled, in other examples, the second storage buffer 112 may be manually controlled (e.g., by pushing/pulling and/or by remote control).

As described in further detail below, after the user 132 turns on the augmented, mixed, or virtual reality device 134 and/or authenticates with the augmented, mixed, or virtual reality device 134 (e.g., using a username and/or password), the workstation may be localized. Localization may include generating, by the augmented, mixed, or virtual reality device 134, virtual objects corresponding to the various objects in the workstation. For example, the augmented, mixed, or virtual reality device 134 may determine a transform for the first storage buffer 110 and/or for the second storage buffer 112. Additionally, the augmented, mixed, or virtual reality device 134 may determine locations of various bins/containers on the first storage buffer 110 and/or on the second storage buffer 112 (e.g., bins 122). The augmented, mixed, or virtual reality device 134 may generate virtual objects (e.g., virtual mobile storage unit objects) corresponding to the first storage buffer 110 and/or the second storage buffer 112 including virtual bins that correspond to the bins of each of the mobile storage bins. In addition, although not shown in FIG. 1, the augmented, mixed, or virtual reality device 134 may generate virtual objects and/or surfaces corresponding to other items of the work station including the floor, the hands of the user 132 (e.g., using a hand tracking algorithm), a label printer within the workstation, work surfaces of the work station, surfaces and/or positions on the mobile storage units, etc., such that the augmented, mixed, or virtual reality device 134 generates and stores a three dimensional virtual environment that corresponds to the physical environment of the workstation. It should be noted that although the augmented, mixed, or virtual reality device 134 may generate a three dimensional mapping of the virtual environment to the physical environment, the augmented, mixed, or virtual reality device 134 does not necessarily display each of the virtual objects included in the virtual environment to the user. Instead, the augmented, mixed, or virtual reality device 134 may use the virtual environment to determine the appropriate location at which to display various graphical data (e.g., graphical highlights, hints, etc.) and/or at which to place various colliders to detect user interaction with the physical environment, as described in further detail below.

The network interface of the augmented, mixed, or virtual reality device 134 may receive workflow data that includes a stream of actions for the user to take. For example, workflow data may indicate that the user 132 is to pick Item A from bin 114 of a robotically-controlled mobile storage unit (e.g., second storage buffer 112) that has arrived at the user's workstation (e.g., the second storage buffer 112 may be navigated to the user's workstation according to the workflow data by the robot or may be manually positioned). The workflow data may further indicate that Item A is to be labeled with a printer label and placed in bin 126 of first storage buffer 110. The workflow data may continue with picking additional items, optionally labeling the items, and placing the items in an outbound storage unit. Alternatively, in an inbound workflow the items may arrive in a first storage buffer and may be placed in a particular bin/container on a robotically-controlled mobile storage unit so that the inbound item/package may be stowed in a robotically-controlled storage field of the relevant facility.

As described in further detail below, the augmented, mixed, or virtual reality device 134 may ingest the workflow data and may determine, for each action, a relevant graphical highlight and/or visual hint to display (if any) and/or may be used to detect interactions with the user 132 to determine if the correct action has been taken. If the correct action is taken by user 132 at a given action of the workflow a user interface component of the augmented, mixed, or virtual reality device 134 may indicate to the user that the correct action has been taken (e.g., by displaying a check mark, a plus, etc., and/or by emitting a chime sound, etc.). The particular user interface including the visual and/or audible indicator can vary according to the desired implementation. Conversely, if the user takes an incorrect action (e.g., by selecting the wrong item or by placing an item in the wrong bin) the user interface component of augmented, mixed, or virtual reality device 134 may indicate to the user that an incorrect action has been taken (e.g., by playing a buzzer, displaying a red "X", displaying text indicating why the performed action was incorrect, etc.). In some examples, a remedial action may be indicated (e.g., using a text overlay and/or graphical hint).

In the example of FIG. 1, a first action of the workflow data received by the augmented, mixed, or virtual reality device 134 may be to take Item X from bin 114 of the second storage buffer 112. Accordingly, since the augmented, mixed, or virtual reality device 134 has previously generated a virtual object for the second storage buffer 112 (which corresponds in terms of position, rotation, and scale with respect to the physical second storage buffer 112) including virtual objects corresponding to each of the bins of the second storage buffer 112, the augmented, mixed, or virtual reality device 134 may display a graphical highlight overlaying the bin 114 (e.g., graphical highlight 116) on the display of the augmented, mixed, or virtual reality device 134. Accordingly, when the user 132 looks toward the bin 114, the user will see the graphical highlight 116 (e.g., a partially transparent polygon of a highlight color, etc.) over the bin 114 from which the user is to select Item X.

In various examples, if the user is facing a different direction such that the bin 114 is not within a field-of-view of the user and/or the camera(s) of the augmented, mixed, or virtual reality device 134, a graphical hint 130 may be displayed on the display of the augmented, mixed, or virtual reality device 134. The graphical hint 130 may be a directional arrow that directs the user toward the graphical highlight 116 (and the bin 114). Accordingly, the graphical hint 130 may be a dynamic display that continually points in the direction of the target (e.g., the graphical highlight 116 and the bin 114) as the user's field-of-view (and the camera's field-of-view) changes. In some examples, a size, length, or color of the graphical hint 130 may vary to indicate a distance between the current field-of-view and the target. For example, if the user is facing 180° away from the target, an arrow graphic (an example of graphical hint 130) may be relatively large. However, as the user turns toward the target the size of the graphical hint 130 may gradually diminish such that the user is intuitively informed that their field-of-view is getting closer to the target. It should be noted that this is merely an example, the graphical hint 130 may instead increase in size as the user's field-of-view approaches the target. Additionally, audible clues (such as a Geiger counter-like beacon sound) may be used to direct the user toward the target.

In various examples, different collider objects (e.g., a virtual object with defined coordinates which may or may not correspond to a mesh of a virtual object) may be positioned over the opening to the various bins (and/or surrounding the label printer, if used). Additionally, colliders may be placed on the virtual objects (e.g., virtual object 150) corresponding to the user's hands (e.g., on the virtual palm of the virtual object 150). A collision may be detected when one collider (e.g., the collider on virtual object 150) intersects with another collider (e.g., a collider placed over bin 114). Similarly, proximity may be determined based on one collider coming within a predefined distance of another collider. A collision may be detected by a plane or 3D shape defining one collider intersecting or touching a plane or 3D shape defining another collider in the virtual 3D space. Accordingly, when the user 132 reaches their hand into bin 114, a collision may be detected between the virtual object 150 corresponding to the user 132's hand and the collider over the virtual object that corresponds to bin 114. Detection of such an interaction with the bin 114 may be detected as an event that is used as an input to the workflow data and may cause the augmented, mixed, or virtual reality device 134 to transition to the next action in the workflow. Events may be detected on the basis of collisions or proximity of the colliders, as desired. The augmented, mixed, or virtual reality device 134 may track its own location within the environment as well as the location of the user's hands (e.g., using a hand tracking algorithm).

In this example, the next action may be a verification that the item selected is the correct item (e.g., Item X). In an example, each item may have a fiducial and/or barcode on the item which may be scanned by the augmented, mixed, or virtual reality device 134. Accordingly, the scanned code from the selected item may be compared to the expected item code in the workflow data. If the codes match, a user interface component of the augmented, mixed, or virtual reality device 134 may generate an indicator that the correct action has been taken. If the wrong item was selected (e.g., the codes do not match), the user interface component of the augmented, mixed, or virtual reality device 134 may indicate that the incorrect item was selected. In the latter case, the user may replace the item in bin 114 and may select a different item from the bin 114 until the correct item is selected. Once the augmented, mixed, or virtual reality device 134 determines that the correct item has been selected (e.g., by matching the codes), the next action of the workflow may be determined.

In some examples, the next action may be to interact with a printer to receive and apply a label to Item X. However, in the example of FIG. 1, the next action may be to place Item X into bin 126 of first storage buffer 110. Accordingly, graphical highlight 118 may be generated and displayed at a position corresponding to the bin 126 (as previously described). Additionally, graphical hint 130 may be displayed and may point toward bin 126 in the physical environment so that the user 132 knows to turn in the direction indicated by the graphical hint 130 in order to see the target location of the target bin 126. Once the user 132 identifies the bin 126 (using graphical hint 130 and the graphical highlight 118), the user may place Item X into the bin 126. Again, the augmented, mixed, or virtual reality device 134 may detect the interaction using the collider on virtual object 150 (corresponding to the user 132's hand or hands) and a collider on or over the virtual object corresponding to bin 126. The workflow may continue in this manner until no remaining actions are in the workflow queue and/or until the user logs out of the augmented, mixed, or virtual reality device 134.

Figure 2:
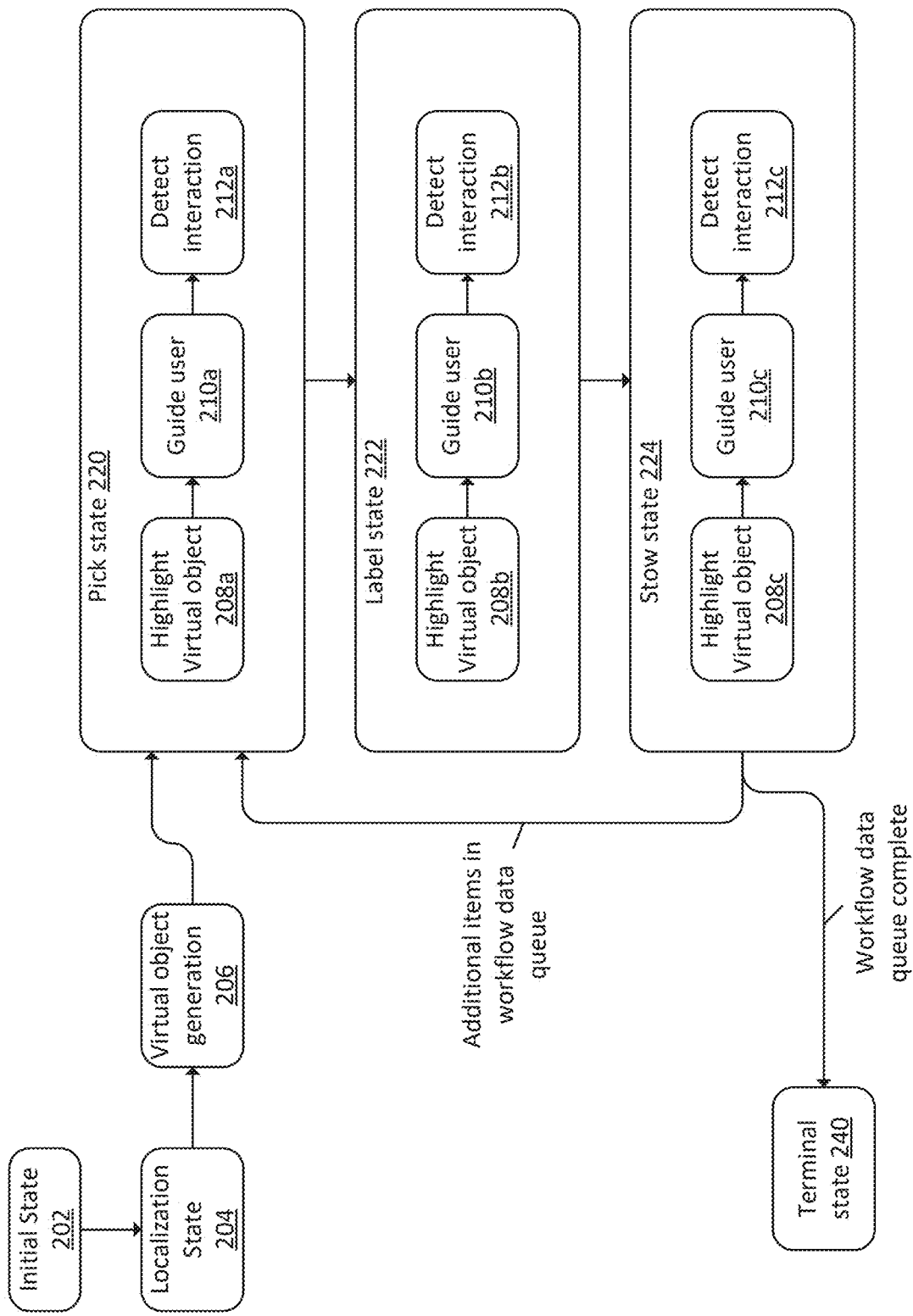
FIG. 2 is a block diagram representing various states of an augmented, virtual, or mixed reality system, in accordance with various aspects of the present disclosure.

FIG. 2 is a block diagram representing various states of an augmented, mixed, or virtual reality system, in accordance with various aspects of the present disclosure. At initial state 202, a user (e.g., user 132 from FIG. 1) may put on the augmented, mixed, or virtual reality device 134, power on the augmented, mixed, or virtual reality device 134, log in, etc. At localization state 204, the augmented, mixed, or virtual reality device 134 may determine where the augmented, mixed, or virtual reality device 134 is in the physical environment with respect to other objects in the physical environment. Additionally, the augmented, mixed, or virtual reality device 134 may determine a transform for each physical object and may generate a three dimensional model (e.g., a virtual 3D model) of the surrounding environment including virtual objects representing the mobile storage units and/or the bins thereon with which the user interacts. For example, the augmented, mixed, or virtual reality system camera(s) may scan fiducials (e.g., QR codes, barcodes, etc.) that are present on the mobile storage units and/or other physical objects within the workstation in order to determine a transform describing the physical objects. The transform may represent an object's position (e.g., in the virtual environment), rotation (relative to predefined axes), and scale (e.g., a magnitude of the object along the axes with relevant units). The fiducials may be automatically scanned by the augmented, mixed, or virtual reality system when they are in the field-of-view of the camera(s). The scale, rotation, and position of the symbols in the fiducial (e.g., the QR code) may enable the augmented, mixed, or virtual reality device to determine the transform of the objects (e.g., the mobile storage units) based on the size of the fiducial relative to the objects (in the image frame) and the angle and position of the fiducial relative to the camera and the various objects in the environment. Accordingly, the transforms for the virtual objects representing physical objects are determined merely by the user glancing in the direction of the physical objects. For example, various augmented, mixed, or virtual reality software systems, such as Unity, support 3D scans and/other scanning techniques that may be used to determine transforms for virtual objects and/or model 3D spaces.

In some examples, the augmented, mixed, or virtual reality system may use computer vision techniques to determine transforms, generate, and/or refine the virtual objects. For example, in addition to or instead of using a fiducial as previously described, the augmented, mixed, or virtual reality system may use an object detection machine learning model (e.g., a convolutional neural network, a visual transformer, an autoencoder, etc.) to detect objects of interest in a given environment (e.g., mobile storage units and/or bins located thereon and/or other objects of interest in the user's workstation). In some examples, the machine learning models may be used to refine the transform of a virtual object whether the virtual object is generated by scanning a fiducial or using one or more computer vision models. In various examples, after refinement, the position, scale, and rotation of the various virtual objects may be accurate to their real-world counterpart objects to within a small distance (e.g., ≤3 cm, 1 mm, 1 m, etc., depending on the scale of the objects involved). Various machine learning approaches that may be used in this context are described below in reference to FIG. 4.

In some other examples, the localization state 204 may generate virtual objects (e.g., virtual containers) and display visualizations of the virtual containers to the user via the headset or other display. The user may be able to select the visualizations in order to move the virtual containers to locations that correspond more closely to the physical containers thereby refining the virtual environment to closely correspond to the physical environment. In some other examples, the user may be able to drag and drop virtual containers (and/or other virtual items) to user-selected positions as part of the localization state 204.

In at least some examples, the mobile storage units may be placed in designated positions that are static (e.g., by the robotic drive systems) or relatively static (e.g., to within a foot or some other desired distance tolerance). As such, once a transform for virtual object is generated during localization (or once a virtual object is generated during virtual object generation 206), the transform and/or the virtual object may be used as a template for any like objects that are in the same place. For example, if one mobile storage unit is moved out of an area, but is replaced by an identical mobile storage unit at the same location, the same virtual object may be used to represent the newly-arrived mobile storage unit (to conserve processing resources).

Additionally, the augmented, mixed, or virtual reality device 134 may determine locations of various bins/containers on the mobile storage units (e.g., first storage buffer 110, second storage buffer 112, etc.). In various examples, the workflow data received by the augmented, mixed, or virtual reality device 134 (and/or configuration data received and/or stored in memory separately) may define a schema for the various objects in the workstation. The schema may define a number of bins for a given mobile storage unit (e.g., by defining a number of columns and a number of rows of bins for the mobile storage unit type). A given bin's dimensions may be provided in the schema as a first percentage of the overall height of the mobile storage unit (as the bin's height), a second percentage of the overall width of the mobile storage unit (as the bin's width), and/or a third percentage of the overall depth of the mobile storage unit (as the bin's depth). For example, a given row of virtual bins may have a height (e.g., a virtual height) defined by the schema as 10% of the total height of the mobile storage unit (whose transform is separately determined). Similarly, a given column of virtual bins may have a width (e.g., a virtual width) defined by the schema as 20% of the total width of the mobile storage unit. In addition, the schema may define different coordinates on the mobile storage unit for a position of a bin. For example, if a particular mobile storage unit has three rows and three columns of bins (for nine total bins), each of the positions of the nine total bins may be designated using two-dimensional coordinates from (1,1) to (3,3) where the first dimension represents rows and the second dimension represents columns (or vice versa). The schema data may generally define the position and dimensions of the bins. In other examples, computer vision may be used to automatically detect the different bin positions and/or the size of the bins. The augmented, mixed, or virtual reality device 134 may store data (e.g., the coordinate data described above) in association with the virtual object representing each bin. Accordingly, each virtual bin/container may be addressable so that if the workflow indicates that a particular bin/container should be interacted with, graphical highlights and/or hints corresponding to the virtual object representing that bin may be generated and/or displayed by the augmented, mixed, or virtual reality device.

In addition, during localization state 204, the augmented, mixed, or virtual reality device 134 may determine transforms for virtual objects and/or surfaces corresponding to other items of the work station including the floor, the hands of the user 132, a label printer within the workstation, work surfaces of the work station, etc. The augmented, mixed, or virtual reality device 134 may use these transforms at virtual object generation 206 to generate and store a three dimensional virtual environment that corresponds to the physical environment of the workstation. In addition, the augmented, mixed, or virtual reality device 134 may use the transforms for each of the mobile storage units and the bins/containers thereon to generate virtual objects (e.g., for the mobile storage units and its bins/containers). The positions of the virtual objects may be refined either by the user (e.g., by dragging and dropping visualizations of the virtual objects to positions that correspond to the physical objects), by computer vision techniques, or some combination of these and/or other techniques.

Localization state 204 may be a continuous state and the augmented, mixed, or virtual reality device 134 may continually update the location and/or transforms describing the various objects detected in the physical environment.

Accordingly, although shown as a sequential state in FIG. 2, localization state 204 may be performed in parallel to the various other states depicted.

In various examples, in addition to camera data (e.g., RGB image data generated by one or more cameras of the augmented, mixed, or virtual reality device 134) different sensor data may be used to detect and localize physical objects and/or to generate corresponding virtual objects. For example, a depth sensor (e.g., a time-of-flight sensor, a light detection and ranging (LiDaR) sensor) may generate depth map data that may be transformed into point cloud data. The point cloud data (or the depth map data) may be used to localize physical objects and/or generate corresponding virtual objects. Additionally, in some examples, such data may be used to refine the localization of the various objects. Such depth data may be used in addition to or separately from the RGB image data.

It should be noted that although the augmented, mixed, or virtual reality device 134 may generate a three dimensional mapping of the virtual environment to the physical environment, the augmented, mixed, or virtual reality device 134 does not necessarily display each of the virtual objects included in the virtual environment to the user. Instead, the augmented, mixed, or virtual reality device 134 may use the virtual environment to determine the appropriate location at which to display various graphical data (e.g., graphical highlights, hints, etc.) and/or at which to place various colliders to detect user interaction with the physical environment, as described in further detail below.

In various examples, each of the virtual bins/containers generated during virtual object generation 206 may be described as "hintable" objects as these are the individual storage areas on which graphical hints/highlights may be provided and with which user interaction is to be detected. A respective collider may be generated for each virtual bin/container. In a simple implementation, a collider for a particular virtual bin may be a polygon that is positioned on the surface of the virtual bin that is on the outer surface of the mobile storage unit (e.g., over the opening to the bin). Accordingly, in order to reach into the bin the user will break the plane formed by the polygon. Additionally, one or more colliders may be generated for the virtual objects/virtual data corresponding to the user's hands. As such, if the user reaches into any bin, a collision will be detected between the collider on the user's hand and the collider on the bin.

Workflow data received by the augmented, mixed, or virtual reality device 134 may indicate a pick operation (e.g., that a particular item is to be selected from a particular bin). Accordingly, in the pick state 220, the augmented, mixed, or virtual reality device 134 may highlight the relevant virtual object (e.g., the virtual bin corresponding to the actual bin that includes the target object) at block 208*a*. The workflow may be generated by an inventory management system, for example. As such, the inventory management system may include data indicating the item identifier (e.g., a unique identifier for the item to be picked) as well as location identifier data (e.g., indicating the particular mobile storage unit and the particular bin from which the item is to be picked). Highlighting the virtual object (block 208*a*) may include generating graphical data that highlights the relevant bin from which the item is to be picked. For example, a colored polygon or other graphical indicator may be displayed over the relevant bin on the display of the augmented, mixed, or virtual reality device 134. The highlight may be semitransparent or opaque, as desired.

Additionally, during pick state 220, a graphical navigational hint may be generated and displayed on the display of the augmented, mixed, or virtual reality device 134 (block 210*a*). The graphical navigational hint may be an arrow, chevron, or other directional hint that determines the direction of the graphical highlight data generated at block 208*a* that highlights the target virtual bin. In some examples, the augmented, mixed, or virtual reality device 134 may determine the shortest distance between a current field-of-view of the camera(s) of the augmented, mixed, or virtual reality device 134 and the target bin including the graphical highlight data in the 3D virtual space. For example, if the user is facing a first direction and the target bin is located at a position that is 90° clockwise from the current field-of-view of the camera, the augmented, mixed, or virtual reality device 134 may determine that the 90° clockwise rotation direction is the shortest distance (e.g., along the surface of a sphere) to transition from the current field-of-view to a field-of-view that is centered on (or otherwise includes) the target bin. The graphical navigational hint may be updated in real time as the field-of-view of the augmented, mixed, or virtual reality device 134 changes. For example, if the user rotates past the target bin and the graphical highlight data highlighting the target bin, such that the target bin is now 60° in a counterclockwise direction relative to the current field-of-view of the augmented, mixed, or virtual reality device 134, the graphical navigational hint will be displayed pointing in the counterclockwise direction on the display.

Additionally, during pick state 220, the augmented, mixed, or virtual reality device 134 may detect an interaction with the target bin by detecting a collision between a collider on either (or both) of the user's hands and the collider over the open surface of (or otherwise associated with) the target virtual bin (block 212*a*). The collision may be determined based on any intersection between a plane or mesh of the collider on the user's hand and the plane or mesh of the collider associated with the target bin in the virtual space. Once the augmented, mixed, or virtual reality device 134 has detected an interaction with the target bin in the pick state 220 (at block 212*a*) the graphical highlight data and the graphical navigational hint may be removed for this particular pick operation of the workflow.

Additionally, once augmented, mixed, or virtual reality device 134 has detected an interaction with the target virtual bin, as described above, the workflow data may expect the user to confirm that the object selected from the bin corresponds to the target object. This may be confirmed by the augmented, mixed, or virtual reality device 134 scanning a code (e.g., a QR code, barcode, etc.) on the object and/or using computer vision to confirm the identity of the object. If the scanned code and/or other identifier data of the selected object does not match the expected identifier (indicating that an incorrect object has been selected), the user interface of the augmented, mixed, or virtual reality device 134 may indicate to the user that the wrong object has been selected (e.g., by displaying a red X on the display, emitting a buzzer sound, displaying text to convey that an incorrect object has been selected, etc.). Conversely, if the scanned code and/or other identifier data of the selected object matches the expected identifier (indicating that the correct object has been selected), the user interface of the augmented, mixed, or virtual reality device 134 may display and/or play back feedback data to indicate to the user that the correct item has been selected (e.g., by displaying a green check mark, playing a chime sound, displaying text indicating that the correct object has been selected, etc.).

At this point, the workflow data received by the augmented, mixed, or virtual reality device 134 may optionally transition to the label state 222. The goal of the label state 222 may be to label the selected object with a label (e.g., from a printer). In some example workflows the label state 222 may be omitted (e.g., where the objects do not need labels or where the objects are pre-labeled).

In the label state 222, the augmented, mixed, or virtual reality device 134 may highlight the relevant virtual object (e.g., the printer and/or a surface including pre-printed labels) at block 208b. A virtual object corresponding to the printer and/or to the labeling station may be generated during localization state 204 and/or virtual object generation 206. Highlighting the virtual object may include generating graphical data that highlights the printer/label station. For example, a colored, cuboid, semi-transparent box or other graphical indicator may be displayed over the printer/label station on the display of the augmented, mixed, or virtual reality device 134. The highlight may be semitransparent or opaque, as desired.

Additionally, during bel state 222, a graphical navigational hint may be generated and displayed on the display of the augmented, mixed, or virtual reality device 134 (block 210b). The graphical navigational hint may be an arrow, chevron, or other directional hint that determines the direction of the graphical highlight data generated at block 208b that highlights the printer/label station. The augmented, mixed, or virtual reality device 134 may determine the shortest distance between a current field-of-view of the camera(s) of the augmented, mixed, or virtual reality device 134 and the printer/label station in the 3D virtual space, as previously described.

Additionally, during label state 222, the augmented, mixed, or virtual reality device 134 may detect an interaction with the target bin by detecting a collision between a collider on either (or both) of the user's hands and the collider associated with the printer (e.g., a three dimensional collider object surrounding the printer/label station). The collision may be determined based on any intersection between a plane or mesh of the collider on the user's hand and the plane or mesh of the collider associated with the printer/label station. Once the augmented, mixed, or virtual reality device 134 has detected an interaction with the printer/label station in the label state 222 (at block 212b) the graphical highlight data and the graphical navigational hint may be removed for this particular label operation of the workflow.

At this point, the workflow data received by the augmented, mixed, or virtual reality device 134 may transition to the stow state 224. The goal of the stow state 224 may be to place the selected object in a different target bin (e.g., relative to the bin from which the target object was selected during the pick state 220). For example, in FIG. 1, if the user picks the target object from the bin 114 (e.g., as highlighted with graphical highlight 116) of second storage buffer 112, the workflow data may direct the user to stow the target object in bin 126 of first storage buffer 110. In examples where the label state 222 is omitted, the workflow may transition from the pick state 220 to the stow state 224.

Accordingly, in the stow state 224, the augmented, mixed, or virtual reality device 134 may highlight the relevant virtual object (e.g., the virtual bin corresponding to the actual bin in which the target object is to be placed) at block 208c. The workflow may be generated by an inventory management system, for example. As such, the inventory management system may include data indicating the item identifier (e.g., a unique identifier for the target object that has been picked during pick state 220) as well as location identifier data (e.g., indicating the particular mobile storage unit and the particular bin in which the item is to be stowed). Highlighting the virtual object may include generating graphical data that highlights the relevant bin into which the item is to be placed. For example, a colored polygon or other graphical indicator may be displayed over the relevant bin on the display of the augmented, mixed, or virtual reality device 134. The highlight may be semitransparent or opaque, as desired.

Additionally, during stow state 224, a graphical navigational hint may be generated and displayed on the display of the augmented, mixed, or virtual reality device 134 (block 210c). The graphical navigational hint may be an arrow, chevron, or other directional hint that determines the direction of the graphical highlight data generated at block 208c that highlights the target virtual bin. The graphical navigational hint may be updated in real time and displayed on the display of the augmented, mixed, or virtual reality device 134 such that the direction in which the user should look to see the target bin is always shown during the stow state 224.

Additionally, during stow state 224, the augmented, mixed, or virtual reality device 134 may detect an interaction with the target bin by detecting a collision between a collider on either (or both) of the user's hands and the collider over the open surface of (or otherwise associated with) the target virtual bin (block 212c). The collision may be determined based on any intersection between a plane or mesh of the collider on the user's hand and the plane or mesh of the collider associated with the target bin. Once the augmented, mixed, or virtual reality device 134 has detected an interaction with the target bin in the stow state 224 (at block 212c) the graphical highlight data and the graphical navigational hint may be removed for this particular stow operation of the workflow.

Once the interaction has been detected in stow state 224 (at block 212c) the workflow may transition to the next state. If there are no additional items to be picked in the workflow (e.g., the workflow data queue is complete), the terminal state 240 may be reached. Conversely, if additional items are to be picked, processing may return to pick state 220 and the workflow may continue as described above.

Figure 3:
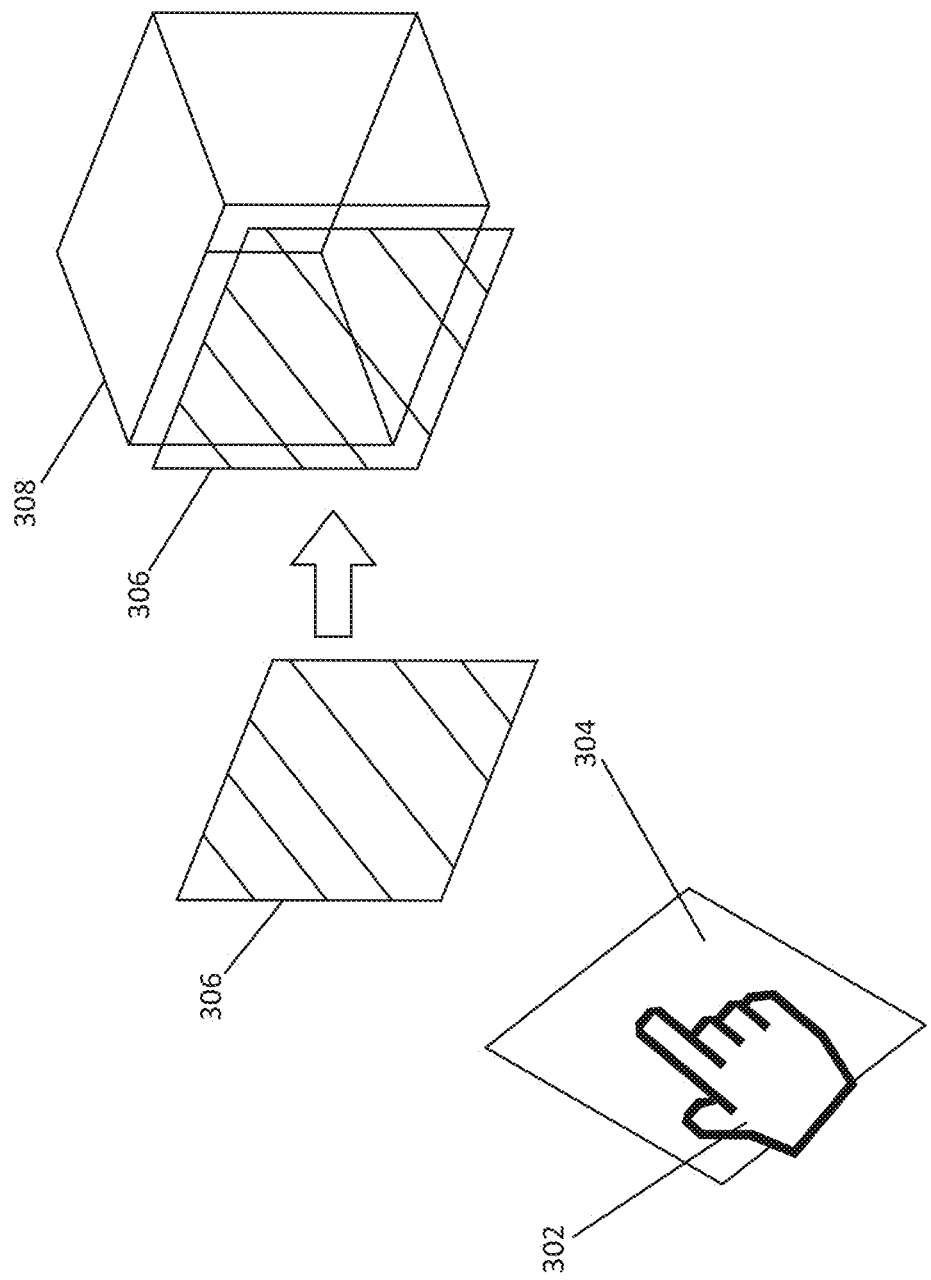
FIG. 3 illustrates an interaction detection technique that may be used with the augmented, virtual, or mixed reality systems described herein, in accordance with various aspects of the present disclosure.

FIG. 3 illustrates an interaction detection technique that may be used with the augmented, mixed, or virtual reality systems described herein, in accordance with various aspects of the present disclosure. In the example of FIG. 3, the user's hand 302 may be detected in one or more frames of image data captured by a camera of the augmented, mixed, or virtual reality device 134. Although only a single hand is shown in FIG. 3, both the user's hands may be detected and an individual collider may be attached to each of the user's hands in the virtual space.

As shown, a collider 304 may be generated and may be attached, in the virtual space, to the hand 302. The collider 304 may be a virtual object which may be a plane (as shown) or a three dimensional mesh (e.g., corresponding to the user's hand) as desired. Additionally, a collider 306 may be generated that corresponds to a particular virtual bin 308. As shown, the collider 306 may be a planar object that may be positioned on the open surface of the virtual bin 308. In other examples, the collider for virtual bins may also be a 3D mesh. It should be noted that the colliders 304, 306 may or may not be displayed to the user on the display of the augmented, mixed, or virtual reality device 134. However, the augmented, mixed, or virtual reality device 134 may detect an interaction by the user with the bin corresponding to the virtual bin 308 when collider 304 intersects with collider 306 in the virtual space. Accordingly, if a step in the applicable workflow data involves the selection of an object in a particular bin that corresponds to virtual bin 308, the interaction with the bin may be detected when collider 304 intersects with collider 306.

Figure 4:
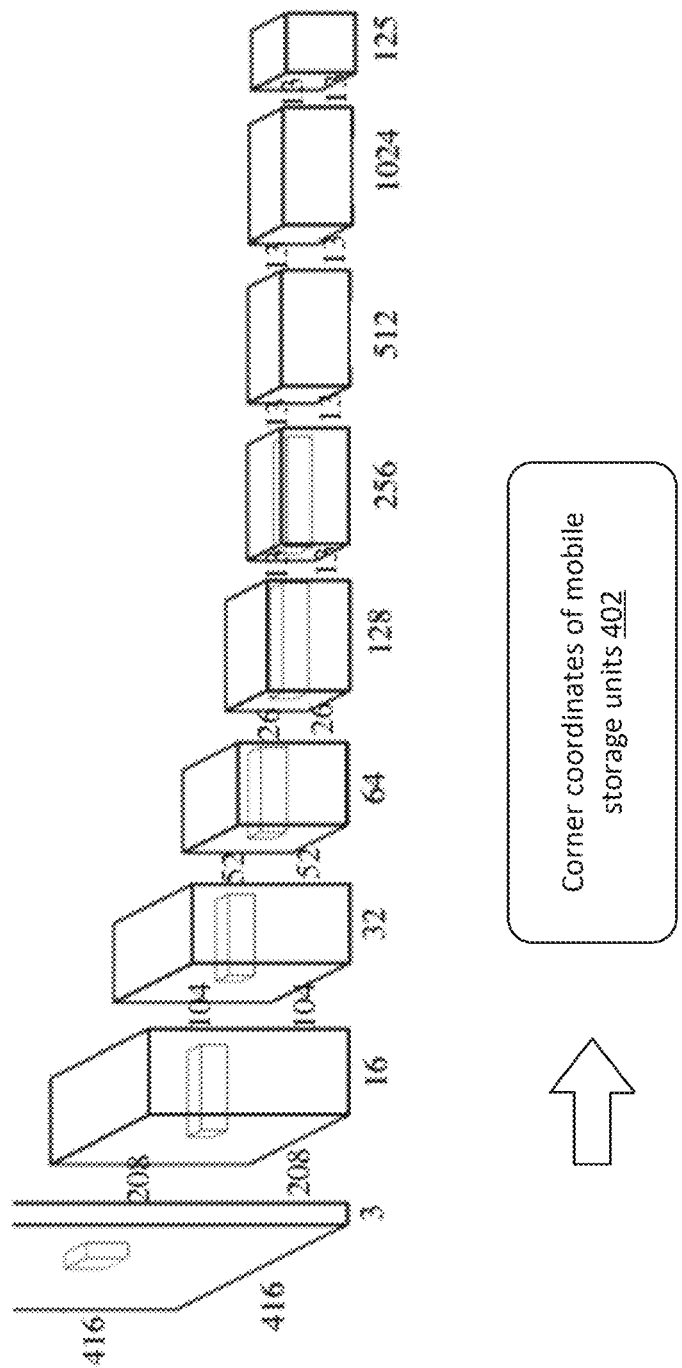
FIG. 4 illustrates an example machine learning model that may be used during localization of various objects in the physical environment of the augmented, virtual, or mixed reality systems described herein, in accordance with various aspects of the present disclosure.

FIG. 4 illustrates an example machine learning model that may be used during localization of various objects in the physical environment (physical space) of the augmented, mixed, or virtual reality systems described herein, in accordance with various aspects of the present disclosure. In the example depicted in FIG. 4, a convolutional neural network is displayed (e.g., Tiny YOLOv2). Advantageously, such a model is very lightweight in terms of memory requirements and can run at high framerates (e.g., ~200 frames per second). However, any desired object detection model may be used. For example, a different CNN, recurrent convolutional neural network (R-CNN), visual transformer, etc., may be used during localization to detect the various objects in the environment and to generate the transforms for these objects so that virtual objects of the appropriate position, rotation, and scale may be generated. For example, a machine learning model (such as that shown in FIG. 4) may be used to detect corner coordinates of mobile storage units 402. Advantageously, using computer vision-based approaches, it may not be necessary that the entirety of a physical object is in view in order to generate the transform for the virtual object. For example, a camera of the augmented, mixed, or virtual reality device 134 may capture an image frame that depicts only some portion of a mobile storage unit in the physical environment. However, the CNN may detect the class of the mobile storage unit and may determine the transform based on the partial information. The transform, in turn, may be used to generate the virtual object.

In addition, non-machine learning-based computer vision architectures may be used to detect and localize objects in the physical environment. For example, manually-engineered features may be detected from RGB image data and/or depth data and used to detect objects. In addition, machine learning-based computer vision models may also be trained to use RGB image data, depth data, or some combination thereof in order to detect and/or localize objects.

In various examples, ground truth image data may be provided during training of the machine learning model. The ground truth image data may depict one or more mobile storage units, bins/containers, printers, surfaces, and/or other components that the model is to learn to detect. Note that training data set may include images with full depictions of such components as well as images with partial depictions of such components (e.g., a picture in which a portion of a mobile storage unit is shown by reason of some other portion being cut off at the border of the image frame). Ground truth labels may include transforms and/or dimensions for the different components of interest. For example, for a given mobile storage unit, data representing the position (e.g., in a coordinate space), rotation (relative to one or more axes), and scale (e.g., the magnitude along the aforementioned axes) may be provided potentially along with data identifying the type of the mobile storage unit, and/or data identifying the depiction of the component(s) in the image frame (e.g., a segmentation mask, bounding box, etc.). Using such information, the machine learning model may learn to localize such components in the image frame. Thereafter, the trained model may be deployed on the augmented, mixed, or virtual reality device 134. During localization state 204 model inference may detect each relevant component as the user looks around the environment and may generate transforms for each object for which the machine learning model has been trained. The transforms may be used during virtual object generation 206 to generate virtual objects corresponding to each physical object.

In addition to localizing the objects/components in the physical space and generating transforms for such objects/components, a machine learning architecture may be used (such as the architecture depicted in FIG. 4) may be used to refine the position and/or dimensions of the virtual objects generated at virtual object generation 206 so that the position and/or dimensions of the virtual objects correspond as closely as possible with their real-world counterparts.

Figure 5:
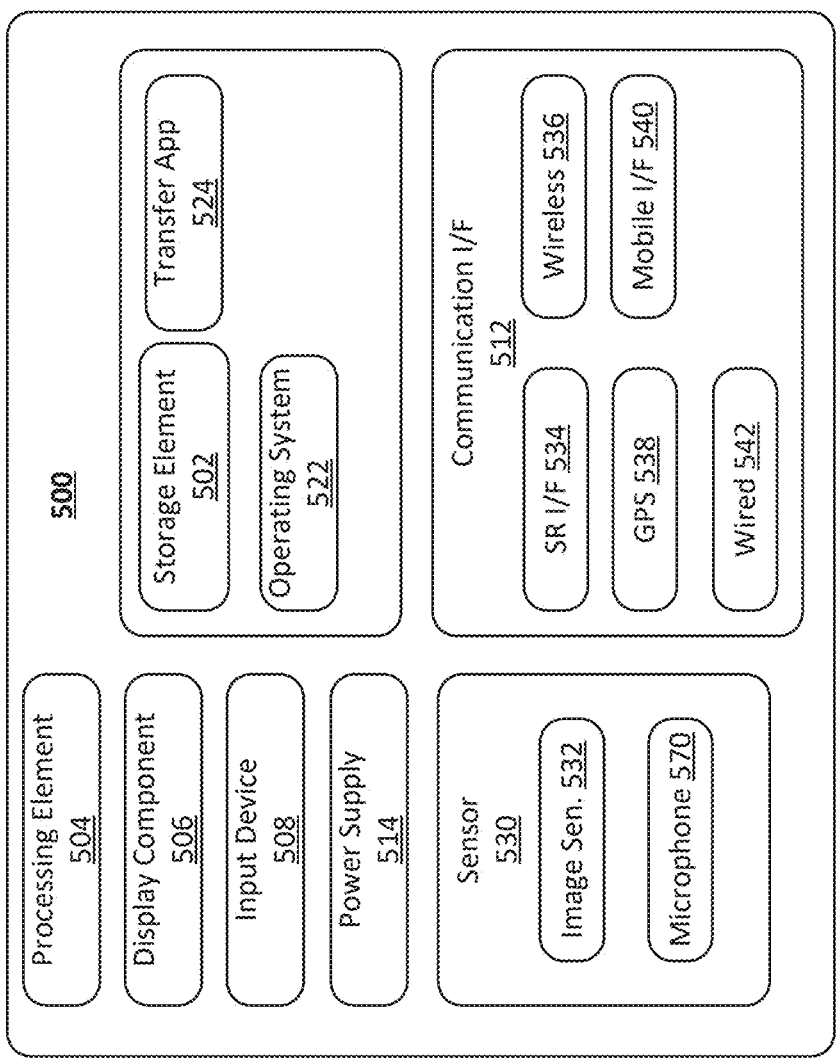
FIG. 5 is a block diagrams showing an example architecture of a computing device that may be used in accordance with various embodiments described herein.

FIG. 5 is a block diagram showing an example architecture 500 of a computing device that may be used in accordance with various aspects of the present disclosure. For example, the augmented, mixed, or virtual reality device 134 may comprise one or more components of the architecture 500. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store segmentation masks generated using the segmentation techniques described herein. In another example, storage element 502 may store one or more machine learning models (and/or parameters thereof) used for the object detection and/or augmented, mixed, or virtual reality techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images generated in accordance with the various techniques described herein. In various examples, the display component 506 may be a wearable display (e.g., in a headset, goggles, and/or glasses)

that may display the various graphical highlight data, graphical navigational hints, text, other graphical data, etc., described herein. In some examples, the architecture 500 may include one or more speakers effective to output audio.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the computing device(s) 120 and/or the augmented, mixed, or virtual reality device 134, as described herein, are exemplary, and may be located as a stand-alone device or may be included, in whole or in part, as a component of a larger device or system.

Figure 6:
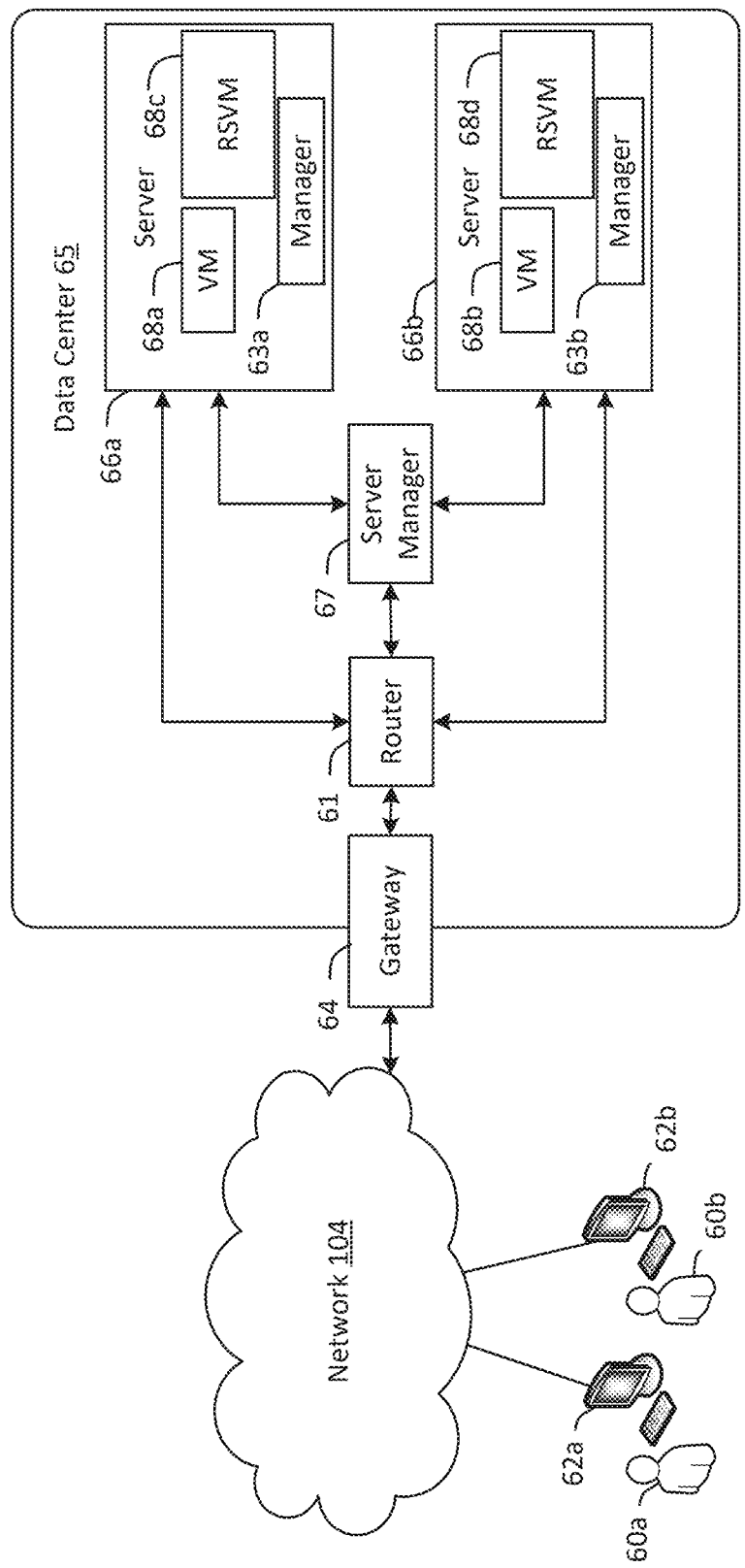
FIG. 6 is a diagram illustrating an example system for sending and providing data that may be used in accordance with the present disclosure.

An example system for sending and providing data that may be used to perform one or more of the various techniques described herein will now be described in detail. In particular, FIG. 6 illustrates an example computing environment in which the embodiments described herein may be implemented. For example, the computing environment of FIG. 6 may be configured to perform object detection and/or virtual object generation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
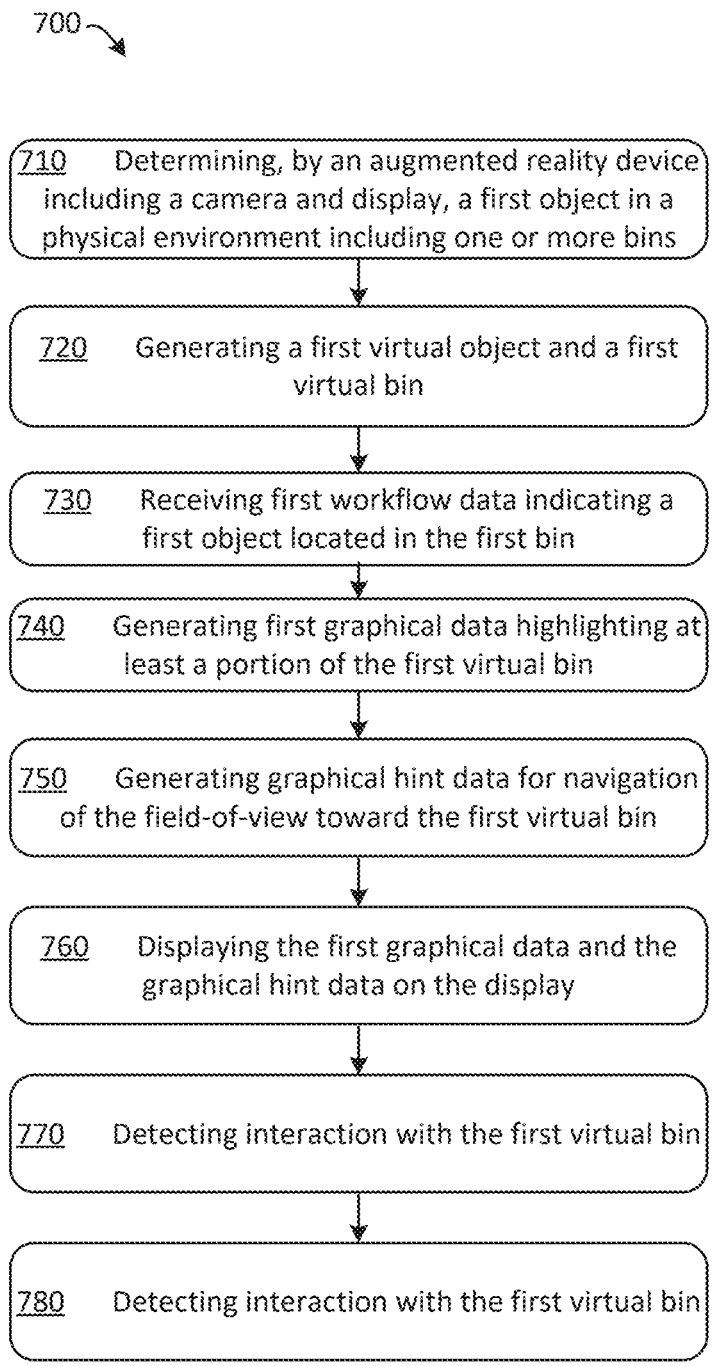
FIG. 7 is a flowchart describing an example process for an augmented, virtual, or mixed reality system, according to various aspects of the present disclosure.

FIG. 7 is a flowchart describing an example process for an augmented, mixed, or virtual reality system, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which an augmented, mixed, or virtual reality device including one or more cameras and/or displays may determine a first object in a physical environment, the physical environment including one or more bins. As used herein, a bin (or container) is a storage component that may be partially enclosed and/or which may be a designated place for storing objects. The augmented, mixed, or virtual reality device may determine the first object (e.g., a mobile storage unit, printer, etc.) by scanning a fiducial and determining the transform for the object based on the position, scale, and/or rotation of the graphics of the fiducial and/or using computer vision techniques (e.g., an R-CNN, etc.), as described herein.

Processing may continue at action 720, at which a first virtual object and a first virtual bin may be generated. As previously described, a virtual object corresponding to each mobile storage unit may be generated. Similarly, a virtual bin corresponding to the physical bin may be generated. Virtual objects (e.g., virtual 3D objects) may be generated from the transform data programmatically using various techniques. For example, Unity game design software and/or other 3D software may be used to programmatically generate a virtual 3D object from transform data.

Processing may continue at action 730, at which first workflow data indicating a first object located in the first bin may be received. The first workflow data may be ingested from any system and may describe that a particular object to be selected is currently stowed in the first bin. For example, the first workflow data may be ingested from an inventory and/or sorting system.

Processing may continue at action 740, at which first graphical data highlighting at least a portion of the first virtual bin may be generated. At action 740, first graphical highlight data (e.g., a partially transparent colored polygon) may be displayed at a position over the first virtual bin. Since the position of the first virtual bin corresponds to the position of the real-world bin in which the target object is located, the first graphical data may call the user's attention to the appropriate bin with which the user should interact according to the workflow data.

Processing may continue at action 750, at which graphical hint data may be generated. The graphical hint data may provide a hint to the user to navigate the field-of-view toward the first virtual bin. For example, the current field-of-view of the user may not include the first virtual bin as the user may be facing another direction. Accordingly, the graphical hint data may be an arrow and/or other graphical indicator that directs the user toward the target virtual bin within the environment. Processing may continue at action 760, at which the first graphical data and the graphical hint data may be displayed on the display of the augmented, mixed, or virtual reality device 134. Note that the first graphical data may only be displayed when the target bin is within the field-of-view of the user.

Processing may continue at action 770, at which interaction with the first virtual bin may be detected. As previously described, interaction with a particular component may be detected by detecting an intersection between a collider on the user's hand/hands and a collider on the target virtual object. In this case, there may be a collider associated with each of the user's hands (e.g., virtual objects corresponding to the user's hands) and another collider associated with the first virtual bin. Accordingly, when the user reaches into the bin, the collider of the virtual hand object will intersect with the first virtual bin collider. The collision may be detected as an interaction (action 780) and may cause the state of the workflow to transition to the next action. As described above, the next action may be to scan the selected object to verify that the object is the correct object. In another example, highlight data and/or graphical hint data for navigation may be generated and displayed to direct the user toward another target bin, etc.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   determining, by an augmented, mixed, or virtual reality device comprising a camera and a display, a first storage buffer in a physical environment, the first storage buffer comprising a first bin;
   generating, by the augmented, mixed, or virtual reality device based on detection of the first storage buffer and the first bin, a first virtual object comprising a first virtual bin, wherein the first virtual object corresponds to the first storage buffer and the first virtual bin corresponds to the first bin;
   receiving, by the augmented, mixed, or virtual reality device, first data indicating a first item located in the first bin;
   generating first graphical data highlighting at least a portion of the first virtual bin; and
   displaying the first graphical data highlighting at least the portion of the first virtual bin on a first portion of the display, wherein the first portion of the display overlays at least a portion of the first bin in a field of view of the camera.

2. The method of claim 1, further comprising:
   determining, by the augmented, mixed, or virtual reality device, a second storage buffer in the physical environment;
   generating, by the augmented, mixed, or virtual reality device, a second virtual object, wherein the second virtual object corresponds to the second storage buffer;
   determining, from the first data, that the second storage buffer is interacted with after the first bin; and
   generating second graphical data highlighting at least a portion of the second virtual object.

3. The method of claim 1, further comprising generating a first collider object positioned on a first surface of the first virtual bin, wherein the first collider object is associated with a first location in a virtual space.

4. The method of claim 3, further comprising:
   determining, by the augmented, mixed, or virtual reality device, that a user has interacted with a portion of a physical space of the user that corresponds to the first location of the first collider object in the virtual space; and
   determining, based at least in part on the user interacting with the first collider object, a next action indicated by the first data.

5. The method of claim 4, further comprising:
   determining a second virtual bin of a second virtual object associated with the next action; and
   generating second graphical data highlighting at least the portion of the second virtual bin.

6. The method of claim 5, further comprising:
   determining that the second virtual bin is not within a current field-of-view of the camera of the augmented, mixed, or virtual reality device;
   generating a first graphical navigational hint that indicates a direction of the second virtual bin within the virtual space; and
   displaying the first graphical navigational hint on the display of the augmented, mixed, or virtual reality device.

7. The method of claim 1, further comprising:
   scanning, by the camera of the augmented, mixed, or virtual reality device, a first fiducial on the first storage buffer;
   determining transform data indicating a rotation, a scale, and a position of the first storage buffer in the physical environment using the scanning of the first fiducial; and
   generating the first virtual object using the transform data.

8. The method of claim 7, further comprising:
   determining a first percentage of a height of the first virtual object;
   determining a second percentage of a width of the first virtual object; and
   generating the first virtual bin with a first virtual height based on the first percentage of the height of the first virtual object and a first virtual width based on the second percentage of the width of the first virtual object.

9. The method of claim 8, further comprising generating the first graphical data on a surface of the first virtual object based at least in part on the first virtual height and the first virtual width.

10. The method of claim 1, further comprising:
    determining that a user has interacted with the first virtual bin based at least in part on a detection that first virtual data representing a hand of the user has interacted with second virtual data representing at least a portion of the first virtual bin;
    scanning, by the camera, a fiducial on an item selected from the first bin by the user;
    determining, using the first data, that the item is a target item; and
    generating feedback data indicating that a correct item has been selected.

11. An augmented, mixed, or virtual reality system comprising:
    a camera;
    a display;
    at least one processor; and
    non-transitory computer-readable memory storing instructions that, when executed by the at least one processor is effective to:
      determine a first storage buffer in a physical environment, the first storage buffer comprising a first bin;
      generate, based on detection of the first storage buffer and the first bin, a first virtual object comprising a first virtual bin, wherein the first virtual object corresponds to the first storage buffer and the first virtual bin corresponds to the first bin;

receive first data indicating a first item located in the first bin;

generate first graphical data highlighting at least a portion of the first virtual bin; and display the first graphical data highlighting at least the portion of the first virtual bin on a first portion of the display, wherein the first portion of the display overlays at least a portion of the first bin in a field of view of the camera.

12. The augmented, mixed, or virtual reality system of claim 11, the non-transitory computer-readable memory storing further instructions that, when executed by the at least one processor, are further effective to:

determine a second storage buffer in the physical environment;

generate a second virtual object, wherein the second virtual object corresponds to the second storage buffer;

determine that the second storage buffer is interacted with after the first bin; and generate second graphical data highlighting at least a portion of the second virtual object.

13. The augmented, mixed, or virtual reality system of claim 11, the non-transitory computer-readable memory storing further instructions that, when executed by the at least one processor, are further effective to generate a first collider object positioned on a first surface of the first virtual bin, wherein the first collider object is associated with a first location in a virtual space.

14. The augmented, mixed, or virtual reality system of claim 13, the non-transitory computer-readable memory storing further instructions that, when executed by the at least one processor, are further effective to:

determine that a user has interacted with a portion of a physical space of the user that corresponds to the first location of the first collider object in the virtual space; and determine, based at least in part on the user interacting with the first collider object, a next action indicated by the first data.

15. The augmented, mixed, or virtual reality system of claim 14, the non-transitory computer-readable memory storing further instructions that, when executed by the at least one processor, are further effective to:

determine a second virtual bin of a second virtual object associated with the next action; and generate second graphical data highlighting at least the portion of the second virtual bin.

16. The augmented, mixed, or virtual reality system of claim 15, the non-transitory computer-readable memory storing further instructions that, when executed by the at least one processor, are further effective to:

determine that the second virtual bin is not within a current field-of-view of the camera of the augmented, mixed, or virtual reality system;

generate a first graphical navigational hint that indicates a direction of the second virtual bin within the virtual space; and display the first graphical navigational hint on the display of the augmented, mixed, or virtual reality system.

17. A method comprising:

determining, by an augmented, mixed, or virtual reality device comprising a camera and a display, a first storage buffer in a physical environment, the first storage buffer comprising a first bin;

generating, by the augmented, mixed, or virtual reality device based on detection of the first storage buffer and the first bin, a first virtual object comprising a first virtual bin, wherein the first virtual object corresponds to the first storage buffer and the first virtual bin corresponds to the first bin;

receiving, by the augmented, mixed, or virtual reality device, first data indicating a first item located in the first bin;

generating first graphical data highlighting at least a portion of the first virtual bin in response to the first data; and displaying the first graphical data highlighting at least the portion of the first virtual bin on a first portion of the display.

18. The method of claim 17, further comprising:

determining, by the augmented, mixed, or virtual reality device, a second storage buffer in the physical environment;

generating, by the augmented, mixed, or virtual reality device, a second virtual object, wherein the second virtual object corresponds to the second storage buffer;

determining, from the first data, that the second storage buffer is interacted with after the first bin; and generating second graphical data highlighting at least a portion of the second virtual object.

19. The method of claim 17, further comprising:

further comprising generating a first collider object positioned on a first surface of the first virtual bin, wherein the first collider object is associated with a first location in a virtual space.

20. The method of claim 19, further comprising:

determining, by the augmented, mixed, or virtual reality device, that a user has interacted with a portion of a physical space of the user that corresponds to the first location of the first collider object in the virtual space; and determining, based at least in part on the user interacting with the first collider object, a next action indicated by the first data.

* * * * *